United States Patent
Tenghamn

(10) Patent No.: US 7,881,158 B2
(45) Date of Patent: Feb. 1, 2011

(54) SEISMIC VIBRATOR HAVING MULTIPLE RESONANT FREQUENCIES IN THE SEISMIC FREQUENCY BAND USING MULTIPLE SPRING AND MASS ARRANGEMENTS TO REDUCE REQUIRED REACTIVE MASS

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 376 days.

(21) Appl. No.: 12/215,863

(22) Filed: Jun. 30, 2008

(65) Prior Publication Data

US 2009/0321175 A1 Dec. 31, 2009

(51) Int. Cl.
*G01V 1/04* (2006.01)
(52) U.S. Cl. ...................................................... 367/168
(58) Field of Classification Search ................. 367/168, 367/23, 174; 181/121, 120, 113; 310/337
See application file for complete search history.

(56) References Cited

U.S. PATENT DOCUMENTS

| | | | | |
|---|---|---|---|---|
| 5,959,939 | A | * | 9/1999 | Tengham et al. ............ 367/174 |
| 6,076,629 | A | | 6/2000 | Tenghamn |
| 6,488,117 | B1 | | 12/2002 | Owen |
| 7,551,518 | B1 | * | 6/2009 | Tenghamn .................. 367/174 |
| 2003/0221901 | A1 | | 12/2003 | Tenghamn |
| 2009/0321175 | A1 | * | 12/2009 | Tenghamn .................. 181/121 |

FOREIGN PATENT DOCUMENTS

WO   WO 2010002431   * 1/2010

OTHER PUBLICATIONS

Lee W. Young, International Search Report, Jul. 31, 2009.

* cited by examiner

*Primary Examiner*—Dan Pihulic
(74) *Attorney, Agent, or Firm*—E. Eugene Thigpen; Richard A. Fagin

(57) ABSTRACT

A seismic vibrator includes a transducer, a reactive mass, a base plate to couple motion of the reactive mass to subsurface formations and a linkage system configured to couple motion of the transducer to the reactive mass and the base plate. The linkage system cooperates with the reactive mass and the transducer to define a first resonant frequency and a second resonant frequency within a range of 1 to 300 Hz.

5 Claims, 4 Drawing Sheets

SEISMIC VIBRATOR HAVING MULTIPLE RESONANT FREQUENCIES IN THE SEISMIC FREQUENCY BAND USING MULTIPLE SPRING AND MASS ARRANGEMENTS TO REDUCE REQUIRED REACTIVE MASS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to geophysical exploration and in particular to a vibratory seismic source useful in geophysical exploration. More particularly, the invention relates to a vibrator using a magnetostrictive driver.

2. Background Art

Seismic energy sources, including vibrators, are used in geophysical exploration on land and in water covered areas of the Earth. Acoustic energy generated by such sources travels downwardly into the Earth, is reflected from reflecting interfaces in the subsurface and is detected by seismic receivers, typically hydrophones or geophones, on or near the Earth's surface or water surface.

Most of the sources used today in land-based seismic survey operations are hydraulically actuated vibrators. Other examples of seismic energy sources include explosives and weight-drop impulse sources. The frequency content of such sources is controllable only to a limited degree, and different sources are selected for the generation of different frequency ranges of seismic energy for different surveying needs. Vibrator sources using piezoelectric or magnetostrictive materials as the actuating elements have been considered for use in land operations in order to provide better control over frequency content than is possible using hydraulic actuation. However, such sources have never been commercially deployed. Although such sources can generate signals over various frequency bands, commonly referred to as "frequency sweeps", the limited power that such sources known to the art have been able to generate have limited their use in land operations.

It is well known that as acoustic waves travel through subsurface geological structures, higher frequency components of the acoustic waves are attenuated more rapidly than lower frequency components, and consequently, lower frequency sound waves can be transmitted over longer distances through geological structures than higher frequency acoustic waves. As such, there is a need in the technical fields of seismic surveying for powerful, controllable frequency, low frequency vibrator type acoustic sources.

One such seismic vibrator is described in U.S. Pat. No. 6,488,117, issued to Owen. The vibrator disclosed in the Owen patent includes a base plate and frame having a means for firmly and rigidly coupling the vibrator to the medium in which vertical dynamic forces produced by an integral electromechanical force driver generate seismic P waves in the ground. The disclosed vibrator also includes a means by which one, two, or more dynamic force driver units are attached to the frame in a manner such that their forces are efficiently transmitted as purely vertical forces to the ground coupling interface via the base plate; one, two, or more dynamic force driver units, operating either on the piezoelectric or magnetostriction force generating principle or on the electrodynamic force generating principle to mechanically excite directed forces on the base plate in the desired seismic source vibrator frequency range; one, two, or more inertial reaction masses suspended on the coupling frame by compliant springs and/or other isolation materials or components, these masses serving as inertial masses against which the force driver units react to apply dynamic forces to the frame and ground coupling base plate; and (5) frame components constructed integrally with the base plate to provide accurate and robust support of the reaction masses and compliant springs so as to avoid any tendencies for unwanted static deflections of the reaction masses or unwanted dynamic vibrations or tilting motions of the frame or base plate during vibrational operation. The described vibrator is "capable of generating vertically oriented forces in the ground to produce controlled seismic waveforms at frequencies typically up to 1,600 Hz and operating at moderate driving forces typically up to 1,000 lbf. This new seismic vibrator source is appropriately matched in size, cost, and mobility to applications in shallow geophysical and geotechnical field surveys", however, the described vibrator is not intended for use in the same frequency range and force as hydraulically actuated vibrators.

Accordingly, there is a continuing need for improved vibrator type seismic energy sources that provide the frequency range and force of hydraulically.

SUMMARY OF THE INVENTION

One aspect of the invention is a seismic vibrator. A seismic vibrator according to this aspect of the invention includes a transducer, a reactive mass, a base plate to couple motion of the reactive mass to subsurface formations and a linkage system configured to couple motion of the transducer to the reactive mass and the base plate. The linkage system cooperates with the reactive mass and the transducer to define a first resonant frequency and a second resonant frequency within a range of 1 to 300 Hz.

In a particular example the vibrator includes a reactive mass connected to a substantially elliptically shaped outer spring, a driver having a first and a second end, at least one outer driver spring connected between the first end and the second end of the driver, and at least one inner driver spring connected between the first end and the second end of the driver. One or more masses are attached to the inner spring. At least one transmission element connects the outer driver spring and the outer spring, which have a reactive mass attached to it. The base plate is connected to the ground and transmits energy into the ground. The outer and inner driver springs and the masses attached to the inner driver spring are selected to determine the first resonance frequency and the second resonance frequency within the frequency range between 1 Hz and 300 Hz.

DETAILED DESCRIPTION

The description of the invention that follows will begin with a brief explanation of the frequency response of a seismic vibrator in contact with the Earth. Following that is a description of an example vibrator.

The total impedance that will be experienced by a seismic vibrator may be expressed as follows:

$$Z_r = R_r + jX_r \qquad \text{(Eq. 1)}$$

where $Z_r$ is the total impedance;
$R_r$ is the radiation impedance, and
$X_r$ is the reactive impedance.

In an analysis of the energy transfer to the Earth from a seismic vibrator, the system of the vibrator and the Earth may be approximated as a baffled piston. In the expression of the total impedance that will be experienced, the radiation impedance $R_r$ of a baffled piston is provided by the expression:

$$R_r = \pi a^2 \rho_0 c R_1(x) \qquad \text{(Eq. 2)}$$

and the reactive impedance is:

$$X_r = \pi a^2 \rho_0 c X_1(x) \qquad \text{(Eq. 3)}$$

where (Eq. 4)

$$x = 2ka = \frac{4\pi a}{\lambda} = \frac{2\omega a}{c}$$

$$R_1(x) = 1 - \frac{2}{x} J_1(x) \qquad \text{(Eq. 5)}$$

and $$X_1(x) = \frac{4}{\pi} \int_0^{\frac{\pi}{2}} \sin(x\cos\alpha)\sin^2\alpha \, d\alpha \qquad \text{(Eq. 6)}$$

In the above expressions $\rho_0$=density of the Earth (ground), $\omega$=angular frequency, k=wave number, a=radius of the piston, c=sound velocity in the Earth, $\lambda$=wavelength of the acoustic energy, and $J_1$=Bessel function of the first order.

Using the Taylor series expansion on the above equations yields the expressions:

$$R_1(x) = \frac{x^2}{2^2 1! 2!} - \frac{x^4}{2^4 2! 3!} + \ldots \qquad \text{(Eq. 7)}$$

$$X_1(x) = \frac{4}{\pi}\left[\frac{x}{3} - \frac{x^3}{3^2 \cdot 5} + \frac{x^5}{3^2 \cdot 5^2 \cdot 7} - \ldots\right] \qquad \text{(Eq. 8)}$$

For low frequencies, defined as when x=2ka is much smaller than 1, the real and imaginary part of the total impedance expression may be approximated with the first term of the Taylor expansion. The expressions for low frequencies, when the wavelength is much larger than the radius of the piston, becomes:

$$R_1(x) \to \frac{1}{2}(ka)^2 \qquad \text{(Eq. 9)}$$

$$X_1(x) \to \frac{8ka}{3\pi}. \qquad \text{(Eq. 10)}$$

For low frequencies, R will be a small number compared to X, which suggests a very low efficiency of energy transfer. However, by introducing a resonance in the lower end of the frequency spectrum, low frequency acoustic energy may be generated and transferred more efficiently. At resonance the imaginary (reactive) part of the impedance is approximately zero, and the source thus is able to efficiently transmit energy into the ground.

The present invention, in one example, comprises a seismic vibrator that has at least two resonant frequencies, preferably within the seismic frequency range of interest. Such frequency range is typically between 1 Hz and 300 Hz.

Figure 1:
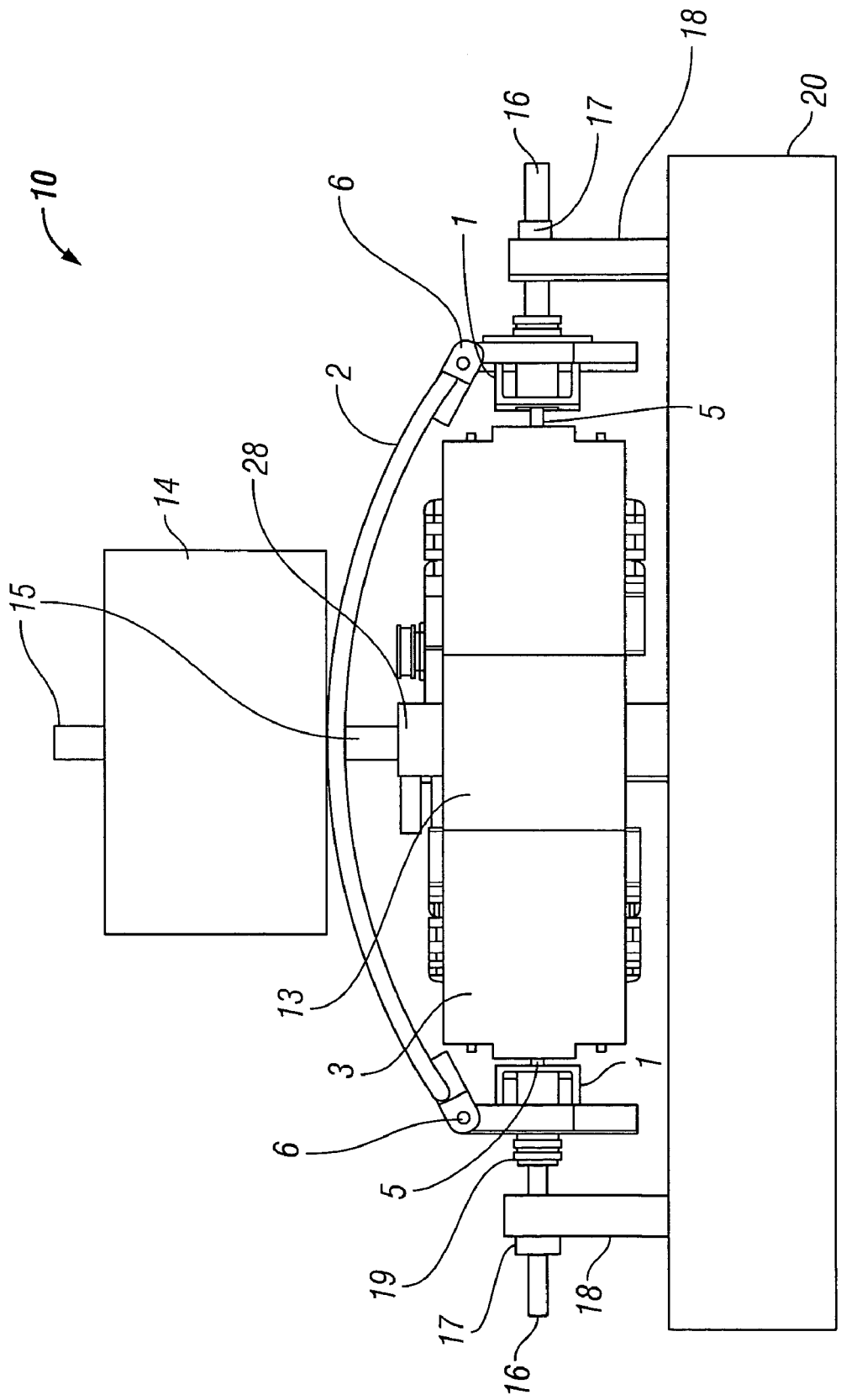
FIG. 1 shows a specific implementation of the invention as it would be deployed for land operations.

FIG. 1 shows an example implementation of a seismic vibrator that may be deployed in seismic survey operations. The seismic vibrator 10 includes a reactive mass 14 mounted on a rod 15 using bearings (not shown) to enable the reactive mass 14 to move up and down along the rod 15. The reactive mass 14 is connected substantially to the center of an elliptically shaped outer leaf spring 2. The outer leaf spring 2 is supported on each and thereof through pivot-type bearings 6 to a support beam 1. Each support beam 1 is coupled through a transmission element 5 to an outer driver spring 3. The support beams 1 can mounted on a support rod 16. The support rod 16 can be coupled, at 17, to a base plate 20 using pedestal type stands 18. The base plate 20 is in contact with the surface to be seismically energized.

Mounting brackets 28 are fixedly connected to the base plate 20 and include a driver (FIG. 2) coupled thereto. The longitudinal ends of the driver are shown at 13 and will be further explained with reference to FIG. 2. When the driver (FIG. 2) operates, the ends 13 move longitudinally so that the inner driver spring 3 changes shape, causing lateral extension and retraction of the connecting points 5, and correspondingly, changes the distance between the end beams 1. Such change in distance causes the outer leaf spring 2 (which is coupled to the beams 1) to change the height of the elliptical arc traversed by the spring 2. Thus, the reactive mass 14 will be accelerated up and down, transmitting energy to the base plate 20, and thereby propagating pressure waves (vibrations) into the ground. To make the design more rigid rods 16 may be connected to the end beam 1, and may be aligned in the horizontal plane through bearings 17 and a support structure 18.

Figure 2:
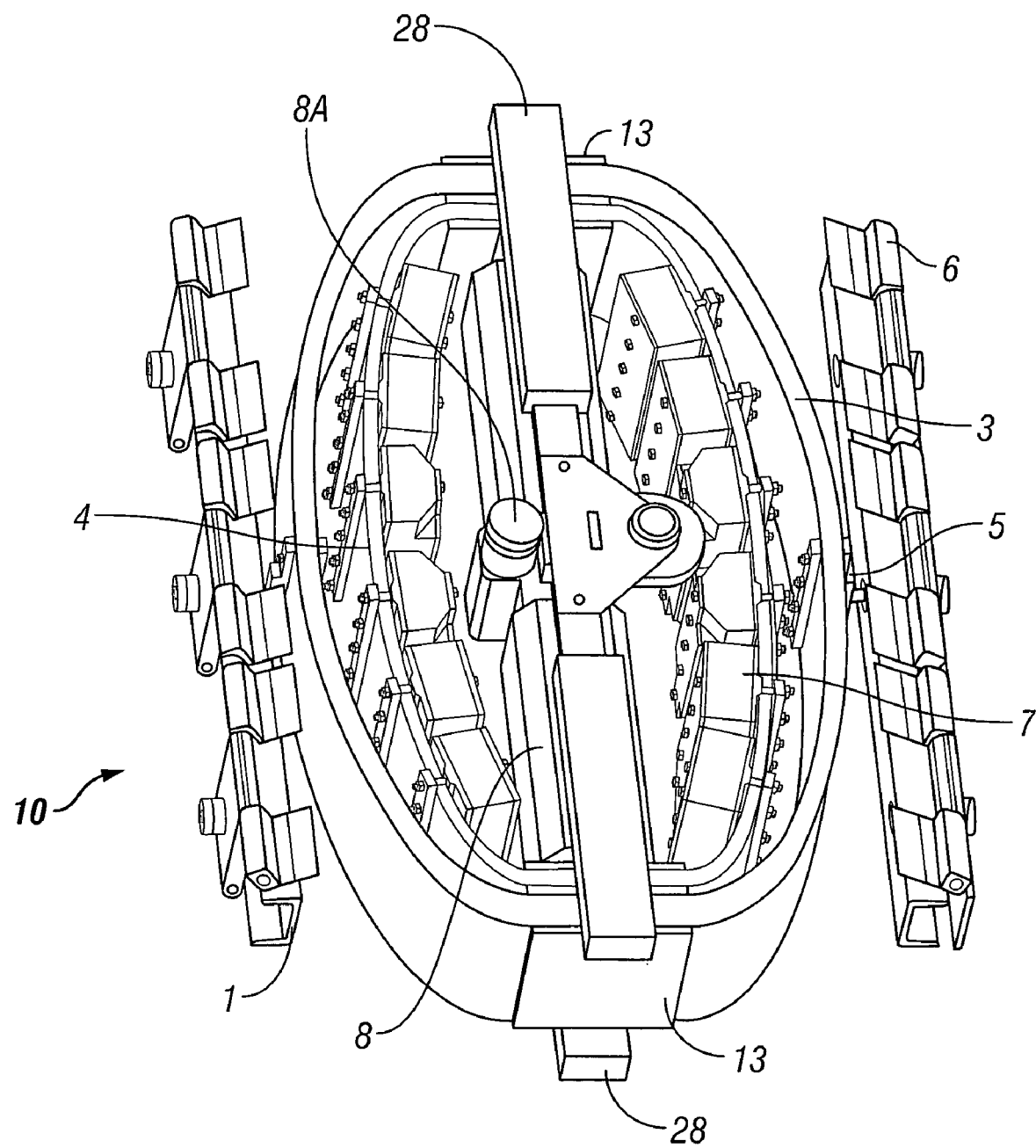
FIG. 2 shows an alternative example of the invention in partial cross-section.

FIG. 2 shows an oblique partial view of the vibrator, which includes the driver 8. The driver is preferably an electromotive or electrodynamic transducer, such as a magnetostrictive or piezoelectric element. As defined herein, an electromotive transducer is a device which can convert an applied electric field or electric current to a change in shape of the driver material. Piezoelectric devices, for example, convert applied electric field to a change in shape of the device. Magnetostrictive devices, for example, change shape in an applied magnetic field, which can be applied by passing electric current through a wire coil, for example.

In the present example, the driver 8 may be a magnetostrictive device, and may preferably include a magnetostrictive material known as ETREMA TERFENOL-D, which is a registered trademark of Edge Technologies, Inc., Ames, Iowa. ETREMA TERFENOL-D magnetostrictive material is an alloy of terbium, dysprosium and iron metals and has the largest magnetostriction at ordinary ambient temperature (about 25 degrees C.) of any presently known material. Although the particular example described herein shows only a single driver, other examples in which a plurality of drivers may be used in parallel is within the scope of the present invention. The present example further includes an outer driver spring 3, connected to each end 13 of the driver 8. In the present particular example, the outer driver spring 3 may have an elliptical shape. In the present example the driver 8 further comprises circuitry (not specifically shown) configured to generate a magnetic field when electrical current is applied to the magnetic circuitry. The magnetic field will cause the magnetostrictive material in the driver 8 to elongate. By varying the magnitude of the electrical current, and consequently the magnitude of the magnetic field, the length of the driver 8 can be varied. In some examples, permanent magnets (not shown) are used to apply a bias magnetic field to the magnetostrictive material. Applying a variable electrical current to wire coils (not shown) that are formed around the magnetostrictive material varies the magnetic field amplitude. Variations in the length of the driver 8 caused by the change in the amplitude of the applied magnetic field cause a corresponding change in the dimensions of the outer driver spring 3.

Other examples of driver materials include electrostrictive materials. An applied electrical field will cause an electrostrictive driver to elongate. Another example is piezoelectric materials that change shape under stress or strain, or applied electric field. By way of example, lead zirconate titanate crystals will exhibit a shape change of about 0.1% of the original dimension. Other transducers that may be coupled to the reactive mass 14 and base plate 20 to produce selected frequencies may be used. It is within the scope of the invention to use other examples of transducers for the driver 8.

Also shown in FIG. 2 is an inner driver spring 4, with masses 7 attached thereto. As further discussed below, the inner driver spring 4, with masses 7 attached thereto is included to provide a second system resonance frequency within the seismic frequency range of interest. Although a vibrator system that included only the outer driver spring 3 would typically display a second resonance frequency, for systems having a size suitable for use in geophysical exploration, the second resonance frequency would be much higher than the frequencies within the seismic frequency range of interest. Providing the inner driver spring with masses is a convenient device to provide the second system resonance frequency.

Mounting brackets 28, shown in FIG. 2, can be fixedly connected to the base plate 20 (shown in FIG. 1). The driver 8 can be fixedly connected at a longitudinally central location 8A thereof to the mounting brackets 28, to maintain a stable reference point for the driver 8. The movement of the ends 13 of driver 8 is unrestricted with reference to mounting brackets 28.

Figure 4:
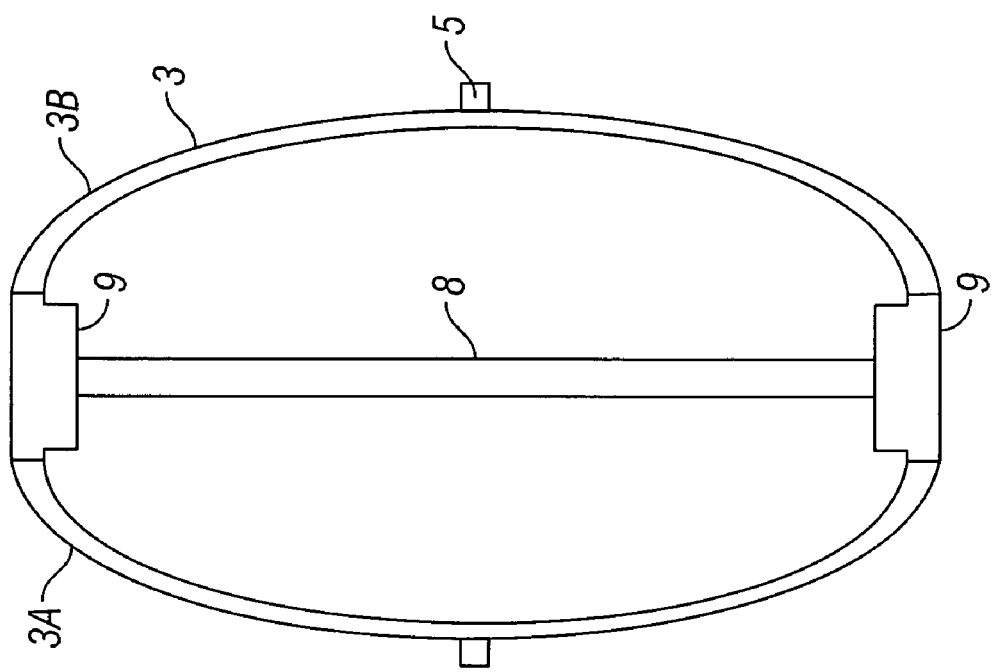
FIG. 4 shows the outer driver spring in combination with the driver.
Figure 3:
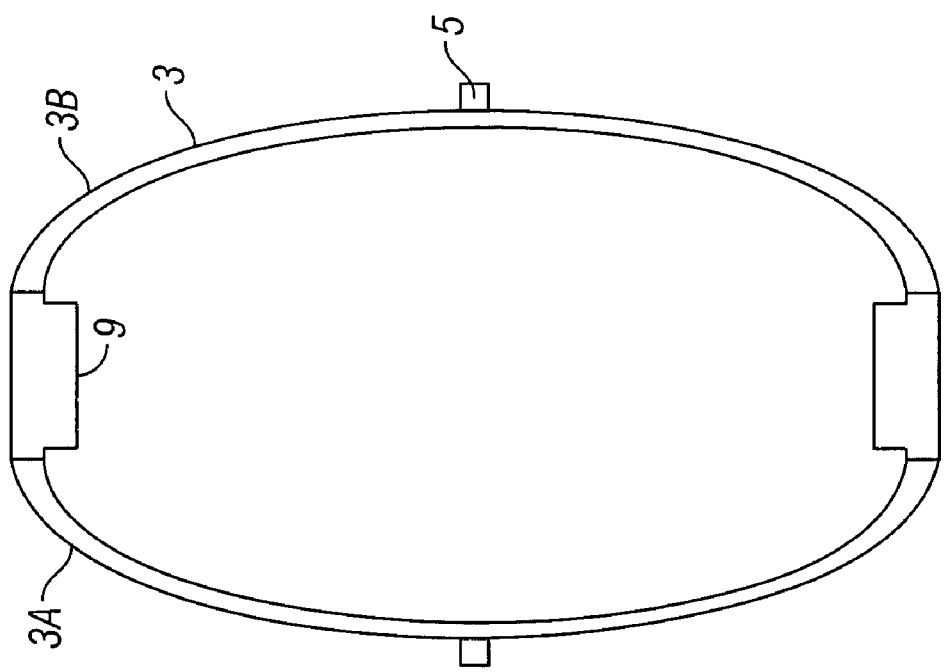
FIG. 3 shows the outer driver spring of an alternative example of the invention.
Figure 5:
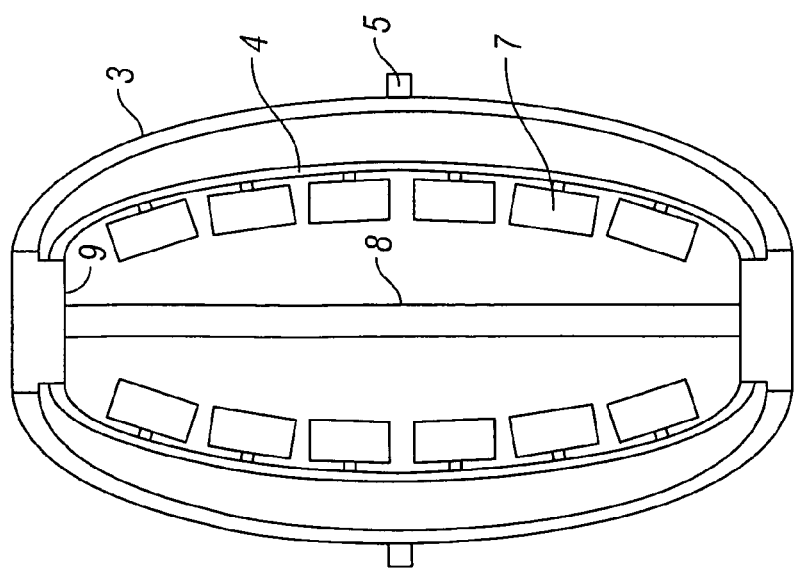
FIG. 5 shows the outer driver spring in combination with the driver, in combination with an inner driver spring with added mass.

Additional details of a particular implementation of the invention are shown in FIGS. 3, 4 and 5. FIG. 3 shows the outer driver spring 3. The outer driver spring 3 has two functions. The first function of the outer driver spring 3 is to move the outer spring (2 in FIG. 1) when the driver 8 lengthens or shortens. The second function is to form part of a resonant system for more efficiently generating energy for transmission into the subsurface. As the length of the driver 8 is shortened, the center portion of the outer driver spring 3, proximate the transmission elements 5, will move outwardly from the driver 8, and as the driver 8 is lengthened, the center part of the outer driver spring 3 will move inwardly toward the driver 8. This movement of the center part of the outer driver spring 3 is transferred to the outer spring (2 in FIG. 1) by means of the transmission elements 5. The movement of the outer spring (2 in FIG. 1) will thereby be enhanced with respect to the movement of the driver 8, with the amount of the enhancement, normally referred to as the "transformation factor." The transformation factor is determined by, among other parameters, the radius 10 of the elliptical outer driver spring 3. The transformation factor is typically within a range of about 2 to 5, depending on the radius of the outer driver spring 3. If larger amplitudes with less force are desired, a larger transformation factor should be selected. The outer driver spring 3 may be formed from two symmetrical spring elements (3A, 3B in FIG. 4) which can be interconnected by driver plates 9. The driver plates can couple to the ends (13 in FIG. 1) of the driver 8, when the vibrator is assembled.

FIG. 4 shows the outer driver spring 3 with the driver 8. FIG. 4 shows the outer driver spring 3 connected to the driver 8 through the driver plates 9, which are attached to each end of the driver 8. The characteristics of the outer driver spring 3, the driver 8 and the outer spring (2 in FIG. 1) substantially determine the first resonance frequency. By selecting the spring constant of the outer driver spring 3, a resonance frequency can be determined at a desired frequency within a seismic frequency range of interest.

FIG. 5 shows the example of FIG. 2 with an inner driver spring 4 with masses 7 attached thereto. The inner driver spring 4 with masses 7 attached thereto will interact with the driver 8 to determine a second system resonance frequency. By selecting the spring constant of the inner driver spring 4 and the masses 7 the second system resonance frequency can be determined at a desired frequency within the seismic frequency range of interest. This second resonance frequency will boost the energy output of the vibrator (10 in FIG. 1) and generate a substantially flat seismic energy output amplitude spectrum between the first and second resonance frequencies.

The outer driver spring 3 and the inner driver spring 4 may each be formed from spring steel, beryllium copper alloy, glass fiber reinforced plastic, carbon fiber reinforced or other suitable flexible spring material. The frequencies of the first and second system resonance are generally selected to be within a range of 1 Hz to 300 Hz.

Figure 6:
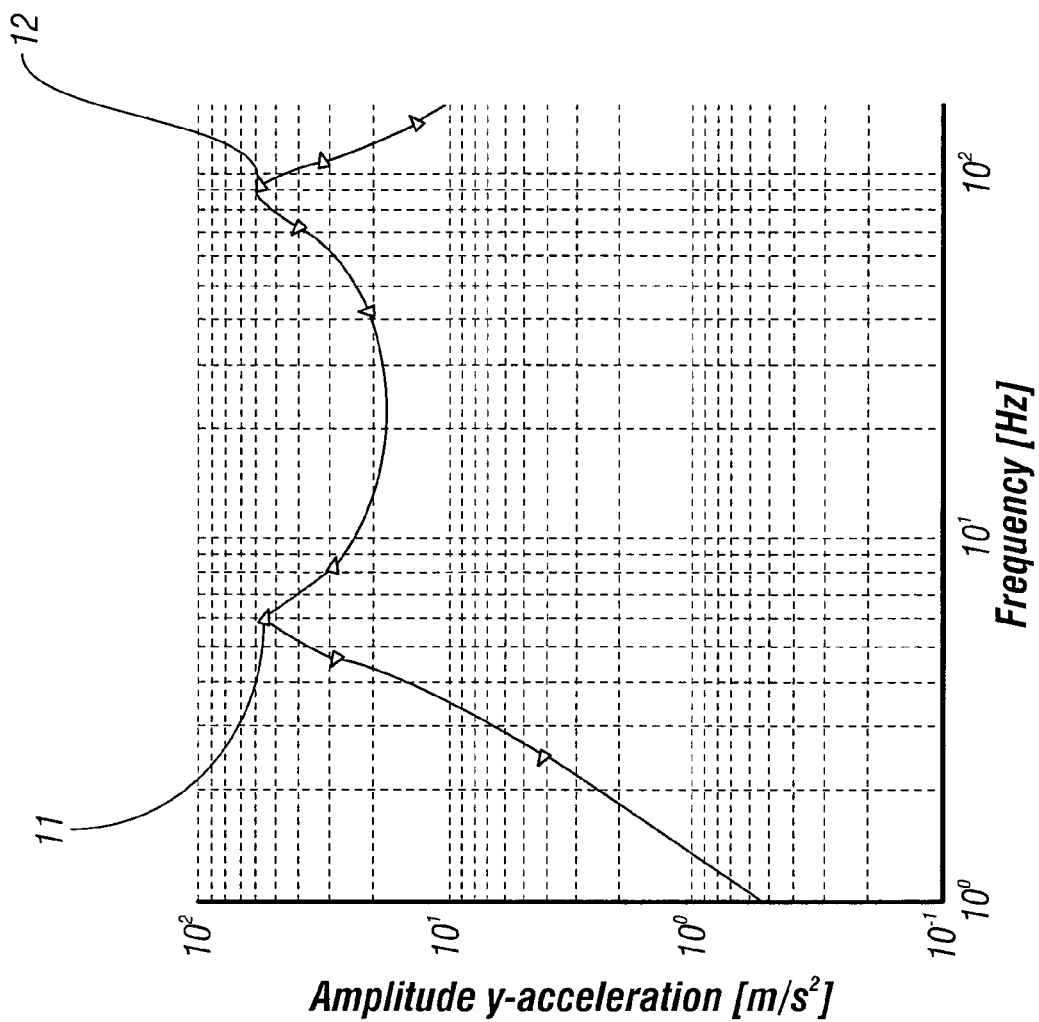
FIG. 6 shows a simulated amplitude spectrum with two resonances.

FIG. 6 shows the results from a finite element simulation of an example of the vibrator according to the invention. The first resonance frequency 11 results substantially from interaction of the outer driver spring 3 and the driver 8 with the outer spring 2 and the reactive mass 14. The second resonance frequency 12 results substantially from the interaction of the inner driver spring 4 with its added masses 7 and the driver 8.

The outer leaf spring 2, the outer driver spring 3 and the inner driver spring 4 shown in the figures could use different types of springs than those shown. For example, the springs might be a coiled spring or other type of springs that perform substantially similarly. Essentially, the springs 2, 3 and 4 are biasing devices that provide a force related to an amount of displacement of the biasing device. Similarly, the outer driver spring 2 and inner driver spring 4 might use a diaphragm, a piston in a sealed cylinder or a hydraulic cylinder to achieve the substantially the same result.

In constructing any specific implementation of the invention, finite element analysis may be used, as is known to those skilled in the art, to determine the first and second resonance frequencies. In any such analysis, the following principles of operation may be considered. If the outer spring (2 in FIG. 1) as approximated is connected to a reactive mass, then, for low frequencies, the mass load acting on the outer spring 2 is:

$$M = \text{reactive\_mass} \tag{Eq. 11}$$

where M is the mass load.

The outer spring (2 in FIG. 1) has a transformation factor $T_{outer\_spring}$ between the long and short elliptical axes, so that the deflection of the outer spring (2 in FIG. 1) will have higher amplitude than the deflection of end beams (1 in FIG. 2) caused by movement of the transmission element 5. Further, the outer driver spring 3 creates a larger mass load on the driver 8 because the outer spring 3 also has a transformation factor between the long axis and short axis of its ellipse, with the long axis being substantially equal to the length of the driver 8 and the short axis being substantially equal to the width of the elliptically shaped outer driver spring 3. Referring to this transformation factor as $T_{spring}$, the mass load on the driver 8 will be:

$$M_{driver} = T^2_{outer\_spring} \cdot T^2_{spring} \cdot M. \qquad \text{(Eq. 12)}$$

The first resonance, $f_{resonance}$, for the acoustic emitter will be substantially determined by the following mass/spring relationship:

$$f_{resonance} = \frac{1}{2\pi}\sqrt{\frac{K}{M_{driver}}} \qquad \text{(Eq. 13)}$$

where:

K=spring constant, and $M_{driver}$=mass load on the driver 8.

K represents the spring constant for the outer driver spring 3 combined with the driver 8, where the outer driver spring 3 is connected to the outer spring (2 in FIG. 1) through the transmission elements 5, end beam 1 and hinges 6.

To achieve efficient energy transmission with the seismic frequency range of interest, it is important to provide the second resonance frequency within the seismic frequency range of interest. In the absence of the inner driver spring (4 in FIG. 2), the second resonance frequency would occur when the outer driver spring 3, acting together with driver 8, is in its second Eigen mode. Such second Eigen mode resonance frequency, however, is ordinarily much higher than the first resonance frequency, and accordingly, would typically be outside the seismic frequency range of interest. As is evident from equation (13), the resonant frequency will be reduced if the mass load on the outer driver spring 3 is increased. This mass load could be increased by adding mass to driver 8, however, in order to add sufficient mass to achieve a second resonance frequency within the seismic frequency range of interest, the amount of mass that would need to be added to the driver 8 would make such a system impractical for use in certain seismic operations.

In the present example, the inner driver spring 4 is included inside the outer driver spring 3, and has added masses 7 coupled to the sides of the inner driver spring 4 as shown in FIG. 2 and FIG. 5. The effect of such added inner driver spring 4 and masses 7 is equivalent to adding mass at the ends of the driver 8 according to the expression:

$$M_{inner} = T^2_{inner} \cdot M_{added} \qquad \text{(Eq. 14)}$$

The inner driver spring 4 will have its own transformation factor, $T_{inner}$, and as well will add to the mass load on the driver 8. Use of the inner driver spring 4, with the added masses 7 enables the second system resonance to be tuned so that the second system resonance is within the seismic frequency range of interest, thereby improving the efficiency of the acoustic emitter in the seismic band. The second resonance may be determined by the expression:

$$f_{resonance2} = \frac{1}{2\pi}\sqrt{\frac{K_{inner} + K_{driver}}{T^2_{inner} \cdot M_{added}}}. \qquad \text{(Eq. 15)}$$

where $K_{inner}$=spring constant of the inner spring and $K_{driver}$=spring constant of the outer driver assembly.

A vibration according to the various aspects of the invention may provide larger signal amplitudes using magnetostrictive or piezoelectric drivers than is possible using vibrator structures known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic vibrator, comprising:
   a transducer having longitudinal ends;
   at least a first substantially fully elliptical driver spring and at least a substantially elliptical fully second driver spring having masses coupled thereto connected at ends thereof to corresponding longitudinal ends of the transducer, the second spring disposed within an ellipse defined by first spring;
   an outer spring coupled across a short axis of the first spring, wherein the first spring and the outer spring define a transformation factor of length of motion of the transducer with respect to length of motion of a reactive mass coupled to the outer spring; and
   wherein the springs and masses in combination define at least two resonant frequencies within a range of about 1 to 300 Hz.

2. The vibrator of claim 1 wherein the transducer comprises a magnetostrictive material.

3. The vibrator of claim 1 wherein the first spring, the transducer and the outer spring together determine a first resonance frequency of the seismic vibrator.

4. The vibrator of claim 1 wherein the second spring, the at least one mass attached thereto and the transducer determine a second resonance frequency of the seismic vibrator.

5. The vibrator of claim 1 wherein the first spring and the outer spring determine the transformation factor.

\* \* \* \* \*